(12) United States Patent
Wallace

(10) Patent No.: US 6,729,819 B2
(45) Date of Patent: May 4, 2004

(54) BOLT LUBRICATING DEVICE AND METHOD

(75) Inventor: Ivan Wayne Wallace, Ludlow, VT (US)

(73) Assignee: Applied Bolting Technology Products, Inc., Rockingham, VT (US)

(*) Notice: Subject to any disclaimer, the term of this patent is extended or adjusted under 35 U.S.C. 154(b) by 0 days.

(21) Appl. No.: 10/189,949

(22) Filed: Jul. 3, 2002

(65) Prior Publication Data

US 2004/0005207 A1 Jan. 8, 2004

(51) Int. Cl.⁷ .......................... F16B 31/02; F16B 37/00; F16B 43/00
(52) U.S. Cl. .......................... 411/11; 411/428; 411/534; 411/903; 411/914
(58) Field of Search ................................ 411/9, 10, 11, 411/428, 534, 903, 906, 914

(56) References Cited

U.S. PATENT DOCUMENTS

| | | | | |
|---|---|---|---|---|
| 3,002,770 A | * | 10/1961 | Chesnut et al. | 411/914 X |
| 3,244,625 A | * | 4/1966 | Silwones | 411/914 X |
| 4,322,193 A | * | 3/1982 | Stahl | 411/11 |
| 4,746,248 A | * | 5/1988 | Lillis et al. | 411/534 X |
| 4,984,938 A | * | 1/1991 | Scott, Jr. et al. | 411/428 X |
| 5,769,581 A | | 6/1998 | Wallace et al. | |
| 5,931,618 A | | 8/1999 | Wallace et al. | |
| 6,152,665 A | | 11/2000 | Wallace et al. | |
| 6,425,718 B1 | | 7/2002 | Herr et al. | |

* cited by examiner

*Primary Examiner*—Neill Wilson
(74) *Attorney, Agent, or Firm*—Cantor Colburn LLP

(57) ABSTRACT

A friction reducing device comprises a stretchable thin film of elastomeric material impregnated or dusted with lubricating material. The thin film adheres to an annular member through which a fastener element having external threads can pass.

22 Claims, 3 Drawing Sheets

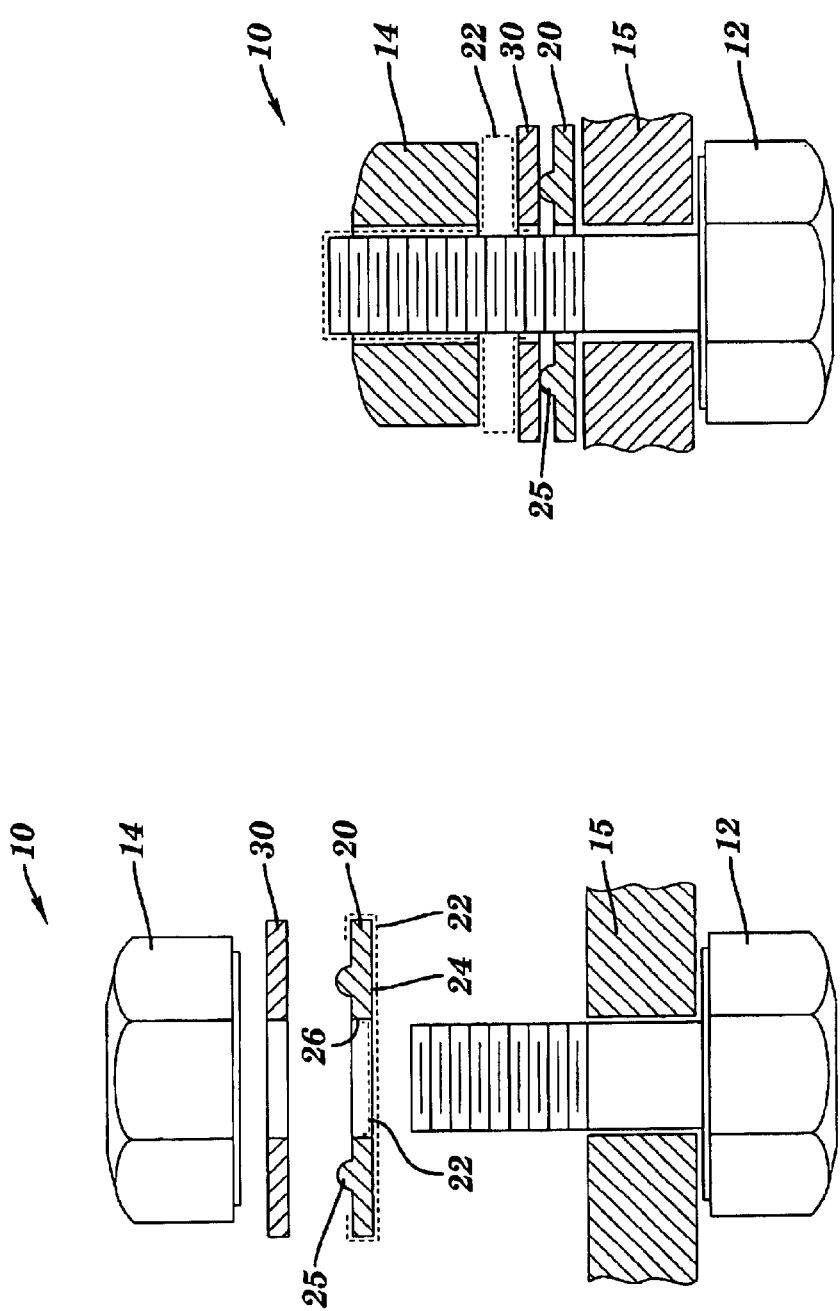

BOLT LUBRICATING DEVICE AND METHOD

BACKGROUND

This invention relates to threaded fasteners. More particularly, this invention relates to a device for and method of lubricating threaded fasteners and other threaded connections.

Bolts are roughly cylindrical connector elements having external threads whereas nuts are annular in shape and have internal threads that mate with the external threads of the bolt. For purposes of this disclosure, "bolt" will refer generally to any connection having external threads while "nut" will refer generally to any connection element having internal mating threads. When a bolt is passed through a medium and a nut is tightened over the bolt, it places the bolt in tension and the medium in compression. The medium can comprise any material to be fastened by the nut and bolt combination, such as engine parts, structural elements, pressure vessel flanges etc. In many instances, the amount of tension required in the bolt is predetermined and necessary to obtain a certain amount of compression in the medium.

Previous methods of tensioning include measuring the torque applied to the nut and estimating from that measurement the amount of tension on the bolt. This method, however suffers from the drawback that friction between the threads of the nut and the bolt may vary from one nut/bolt combination to next and is affected by a number of factors including coatings, corrosion, heat, dust, moisture, and manufacturing differences or imperfections.

Another method for accurately tensioning a bolt includes the use of a direct tension indicator, such as are discussed in commonly-assigned U.S. Pat. No. 5,769,581, issued Jun. 23, 1998, U.S. Pat. No. 5,931,618 issued Aug. 2, 1999, and U.S. Pat. No. 6,152,665 issued Nov. 28, 2000, all of which are issued to Wallace et al. and are wholly incorporated herein by reference. Reference is also made to U.S. patent application Ser. No. 09/613,993 filed Jul. 11, 2000 by W John A. Herr et al., said application also being incorporated herein by reference. In such devices, a washer-like element having protrusions is placed between the nut and the bolt head. The protrusions are calibrated to deform and flatten when the desired amount of bolt tension is reached. The amount of tension can then be determined based on the gap between adjacent elements caused by the direct tension indicator.

Direct tension indicators are currently available in the "regular" and "self-indicating" types. The regular style requires the use of a feeler gauge to judge the residual gap closure. The self-indicating style include an elastomeric dye that becomes ejected from beneath the protrusions when the protrusions are flattened. Thus, with the self indicating style, the residual gap closure is judged by a visual assessment of the "squirt event."

Both styles of direct tension indicators are used on bolts to control the tension of the bolt as it is being tightened.

It has been found, however, that friction between the threads of the nut and bolt can adversely affect the performance of these devices as well. Specifically, friction can undermine confidence in direct tensioning devices when the necessary effort to reach the specified bolt tension is much greater than expected due to the friction. Thus, when the torque resistance within the bolt assembly builds up to the point where the bolt tightening equipment cannot overcome it, the direct tension indicator protrusions are unacceptably high, and it may be declared that the bolt has not been tensioned correctly. Because of excessive torque buildup, therefore, the bolt tightening equipment is inadequate. The bolt installers often incorrectly attribute this failure to correctly compress the direct tension indicator protrusions to the direct tension indicator having been manufactured with protrusions that are too strong. This incorrect conclusion results in improper bolt tightening and controversial corrective procedures and extra cost.

It would therefore be desirable to provide a means for controlling the friction between the threads of the bolt and the threads of the nut to reduce the effort required to overcome friction effects and therefore improve user confidence in the direct tension indicators.

SUMMARY

The above and other disadvantages of the prior art are overcome or alleviated by a friction reducing device comprising a stretchable thin film of elastomeric material impregnated or dusted with lubricating material. The thin film adheres to an annular member through which a fastener element having external threads can pass.

The above described and other features are exemplified by the following figures and detailed description.

BRIEF DESCRIPTION OF THE DRAWINGS

FIG. 1 shows an exploded view of a bolt assembly according to one embodiment.

FIG. 2 shows the assembly of FIG. 1 as it appears when assembled.

DETAILED DESCRIPTION

Figure 4:
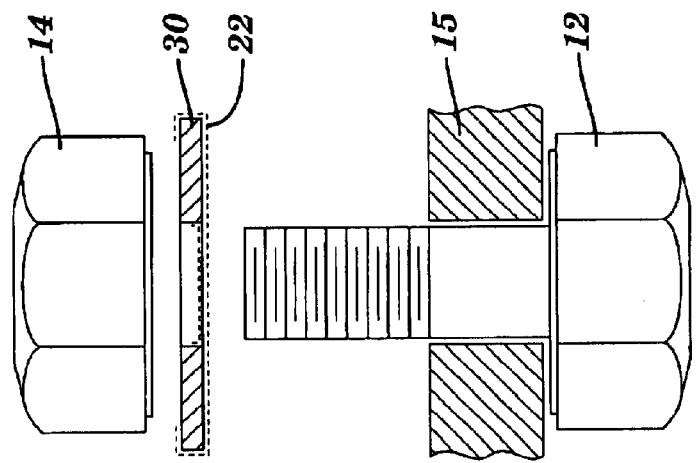
FIG. 4 shows an exploded view of a bolt assembly according to yet another embodiment.

FIG. 1 shows an exploded view of a bolt assembly according to a first embodiment in which a bolt 12 extends through medium 15, direct tension indicator 20, washer 30, and nut 14 for fastening and applying compressive force to medium 15. Bolt 12, washer 30, and nut 14 are of conventional manufacture and individually do not form a part of the invention. Direct tension indicator 20 is constructed in accordance with previous direct tension indicators as discussed in the background section above, with the exception of the addition of a lubricating membrane 22, which is disposed at an underside 24 and/or an inner diameter 26 of the direct tension indicator 20.

Lubricating membrane 22 is a stretchable thin film optionally impregnated with lubricant. The thin film is an elastomeric material, i.e., a material that is able to undergo large, reversible deformations. Useful elastomeric materials include, without limitation, natural and synthetic elastomers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymers (EVA)

epichlorohydrin rubbers, chlorinated polyethylene rubber, chlorosulfonated polyethylene rubbers, hydrogenated nitrile rubber, tetrafluoroethylene/propylene rubber, polyamides, including polyether block amides, polyurethane and mixtures thereof. As used herein, the term elastomer will refer to a blend of synthetic and natural rubber, a blend of various synthetic elastomers, or simply one type of elastomer as well as functionalized elastomers and the like. Preferred elastomers are polyurethanes, including those available from E. I. Du Pont de Nemours Co., under the trade name LYCRA® polyurethane.

Examples of the optional lubricant that can be incorporated into the thin film include graphite, fluorinated graphite, hexagonal boron nitride, molybdenum disulfide, antimony sulfide, mica, fluorine mica, talc, tungsten disulfide, carbon black, polymers such as tetrafluoroethylene (i.e., Teflon), mixtures thereof, and the like.

The film is applied by dispensing the elastomer within the inner diameter of the direct tension indicator 20, heat curing, and treating with a mold release agent to free the film from the containing surface. A thread lubricant is then dusted, coated or otherwise applied to the film. Examples of the thread lubricant include graphite, fluorinated graphite, hexagonal boron nitride, molybdenum disulfide, antimony sulfide, mica, fluorine mica, talc, tungsten disulfide, carbon black, polymers such as tetrafluoroethylene (i.e., Teflon), mixtures thereof, and the like. Alternatively, the elastomer can be attached over a bottom surface of the direct tension indicator as a stretched film that clings to the direct tension indicator surface and outer edge. Such a film would not need curing, but would still be dusted with a thread lubricant.

When the direct tension indicator is installed over the bolt threads as shown in FIG. 2, the lubricating film stretches and forms a lubricating prophylactic membrane that reduces the frictional resistance within the mating threads and ahead of the nut, and therefore reduces the torque build-up.

Figure 5:
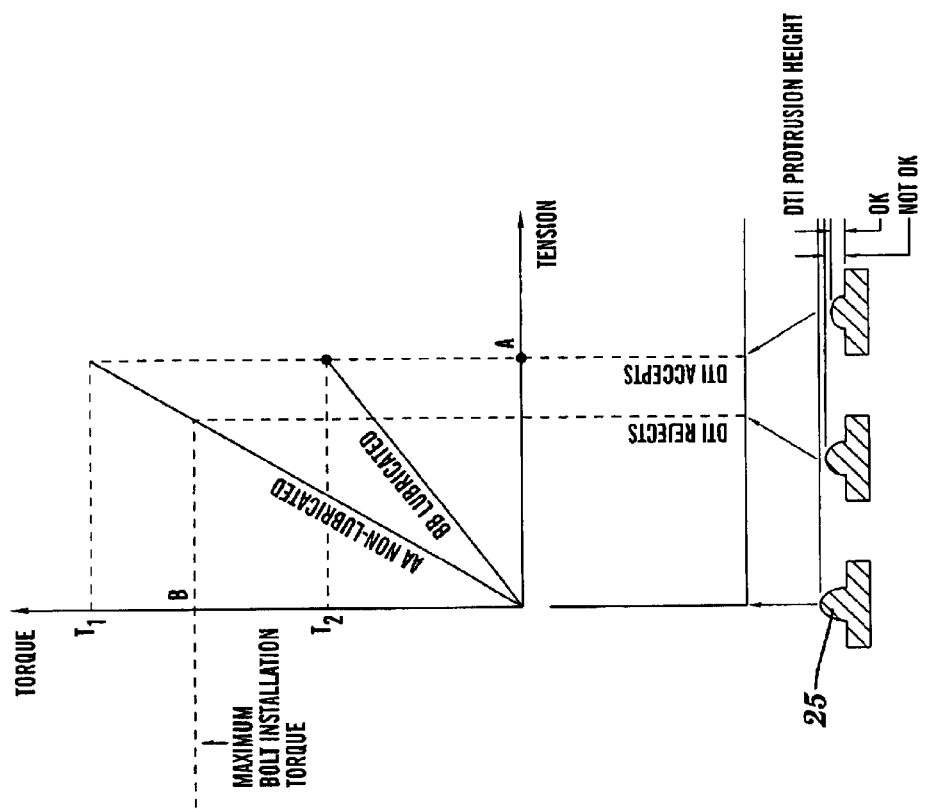
FIG. 5 is a graph of torque versus tension for a direct tension indicating washer with and without a lubricating membrane.

Referring to FIG. 5, the benefits of the lubricating membrane is graphed with the torque applied to the nut being plotted on the y-axis and the resulting bolt tension being plotted on the x-axis. Tension is also indicated by the protrusion height which is depicted beneath the x-axis. To obtain the desired tension A, a torque $\tau_1$ must be obtained when the bolt and/or nut is weathered or otherwise not in ideal condition. However, the maximum amount of torque available to install the bolt is B, which is less than $\tau_1$, therefore desired amount of tension is not obtained and the protrusions remain unflattened, thereby rejecting the amount of applied tension.

With the lubricating membrane, however, the necessary torque to obtain the desired tension A is $\tau_2$, which is less than $\tau_1$ as well as the maximum torque available B. Thus, the nut is tightened until the direct tension indicator protrusion flattens as required whereupon the bolt tension amount is A.

Thus, the action of installing direct tension indicator 20 having lubricating membrane 22, accomplishes the automatic lubrication of the bolt assembly. The benefits of easier bolt installation and easier direct tension indicator compression leads to a more accurate bolt tension result without any extra work.

Figure 3:
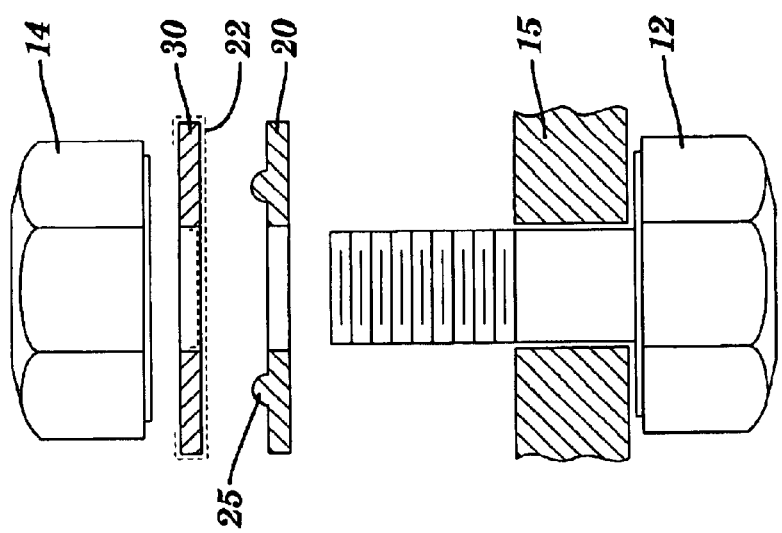
FIG. 3 shows an exploded view of a bolt assembly according to another embodiment.
Figure 4A:
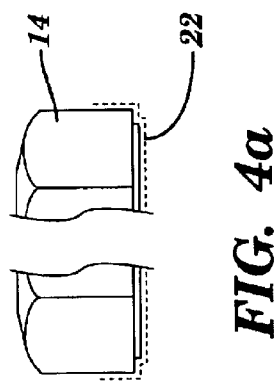
FIG. 4a shows a cross-sectional view of a nut assembly according to yet another embodiment.

FIG. 3 shows a second embodiment in which lubricating membrane 22 is installed on washer 30 rather than direct tension indicator 20. This achieves a similar benefit to the embodiments shown in FIGS. 1 and 2 described above, but provide more flexible use of the lubricating membrane and indicator. FIG. 4 shows another embodiment wherein a lubricating membrane 22 is attached to washer 33 for reducing the amount and provide a more predictable friction amount between nut 14 and bolt 12. FIG. 4a shows another embodiment where the lubricating membrane 22 is attached to nut 14. This not only reduces the effort required to tighten the bolt assembly, but improves the tensioning accuracy of a torque wrench.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

I claim:

1. A device for reducing friction between mating threads comprising:
    a stretchable thin film of elastomeric material impregnated or dusted with lubricating material, the thin film being adhered to an annular member and positioned across an opening in said annular member through which a fastener element having external threads can pass so that said thin film engages said external threads of said fastener upon passing through said opening.

2. The device of claim 1 wherein the annular member comprises a washer.

3. The device of claim 1 wherein the annular member comprises a direct tension indicator.

4. The device of claim 1 wherein the lubricating material comprises a nut.

5. The device of claim 1 wherein the lubricating material comprises of a fluoropolymer.

6. The device of claim 1 wherein the lubricating material comprises graphite powder.

7. The device of claim 1 wherein the lubricating material comprises molybdenum disulphate.

8. The device of claim 1 wherein the elastomeric material comprises polyurethane.

9. The device of claim 1 wherein the elastomeric material is disposed at an inner diameter of the annular member.

10. The device of claim 9 wherein the elastomeric material is applied to the annular member by dispensing liquid polyurethane within the inner diameter of the annular member, heat cured, and dusted with said lubricating material.

11. The device of claim 1 wherein the elastomeric material is disposed at an underside of the annular member.

12. The device of claim 11 wherein the elastomeric material is attached over said underside as a stretched film that clings to said underside and an outer edge of said annular member.

13. A direct tension indicator device comprising an annular member having an opening therethrough and extending primarily in a plane at right angles to its axis, said annular member having at least one protrusion out from said plane, said at least one protrusion becoming flattened upon application of sufficient compressive force in the axial direction; said direct tension indicator further including a stretchable thin film of elastomeric material impregnated or dusted with lubricating material, the thin film being adhered to said direct tension indicator and extending across said opening so that said thin film engages external threads of a fastener upon passing through said opening.

14. The direct tension indicator of claim 13 wherein the lubricating material comprises of a fluoropolymer.

15. The device of claim 13 wherein the lubricating material comprises graphite powder.

16. The device of claim 13 wherein the lubricating material comprises molybdenum disulphate.

17. The device of claim 13 wherein the elastomeric material comprises polyurethane.

18. The device of claim 13 wherein the elastomeric material is disposed at an inner diameter of the annular member.

19. The device of claim 13 wherein the elastomeric material is applied to the annular member by dispensing liquid polyurethane within the inner diameter of the annular member, heat cured, and dusted with said lubricating material.

20. The device of claim 13 wherein the elastomeric material is disposed at an underside of the annular member.

21. The device of claim 20 wherein the elastomeric material is attached over said underside as a stretched film that clings to said underside and an outer edge of said annular member.

22. A method of lubricating a threaded connection comprising:
    placing an annular member having a stretchable thin film of elastomeric material over a first part having external threads;
    tightening a second part having internal threads over said external threads, said tightening causing said internal and external threads to mate; and
    forming a lubricating prophylactic membrane between said external threads and said internal threads from said elastomeric material.

* * * * *